(12) United States Patent
Chang (10) Patent No.: US 11,007,817 B2
(45) Date of Patent: May 18, 2021

(54) HIDDEN-HANDLE QUICK-RELEASE STRUCTURE

(71) Applicant: SHUN XIN CO., LTD., Taichung (TW)

(72) Inventor: Chin-Chao Chang, Taichung (TW)

(73) Assignee: SHUN XIN CO., LTD., Taichung (TW)

( * ) Notice: Subject to any disclaimer, the term of this patent is extended or adjusted under 35 U.S.C. 154(b) by 375 days.

(21) Appl. No.: 16/017,860

(22) Filed: Jun. 25, 2018

(65) Prior Publication Data

US 2018/0361787 A1    Dec. 20, 2018

(51) Int. Cl.
*B62K 25/02* (2006.01)
*B60B 27/02* (2006.01)
*B60B 35/00* (2006.01)

(52) U.S. Cl.
CPC .......... *B60B 27/026* (2013.01); *B60B 35/004* (2013.01); *B62K 25/02* (2013.01); *B60B 2900/112* (2013.01); *B60B 2900/115* (2013.01); *B60B 2900/325* (2013.01); *B60B 2900/3312* (2013.01); *B60B 2900/531* (2013.01)

(58) Field of Classification Search
CPC ..... B60B 27/02; B60B 27/023; B60B 27/026; B60B 35/004; B62K 25/02; B62K 2206/00
See application file for complete search history.

(56) References Cited

U.S. PATENT DOCUMENTS

| 9,963,190 | B1 * | 5/2018 | Liu | B62K 25/02 |
| 2016/0121961 | A1 * | 5/2016 | Schlanger | B60B 27/026 301/124.2 |
| 2017/0259616 | A1 * | 9/2017 | Fusari | B60B 27/026 |

\* cited by examiner

*Primary Examiner* — Scott A Browne (57) ABSTRACT

A handle-hidden quick-release structure has: an outer shaft lever having a shaft lever external thread on an outer circumferential surface of one end thereof, at least one clamping slot on the other end face thereof and an axially extending receiving hole, wherein a wall of the receiving hole has a step surface; an internally hidden rotating handle having a first rod body and a second rod body, wherein the first rod body is disposed in the receiving hole of the outer shaft lever, a stop portion radially protrudes outwards from the first rod body, the second rod body has a rod body and a rod head, the rod body is disposed in the receiving hole, one end of the rod body is pivoted to the first rod body, the other end of the rod body is connected with the rod head.

20 Claims, 8 Drawing Sheets

HIDDEN-HANDLE QUICK-RELEASE STRUCTURE

BACKGROUND of INVENTION

1. Field of Invention

The invention relates to a component of a bicycle, and more specifically to a handle-hidden quick-release structure.

2. Description of Related Art

A quick-release structure of a bicycle is mainly used to allow quick assembling and disassembling between a wheel and a frame.

There are various types of bicycles which require different types of applicable quick-release structures. For a quick-release structure used in a mountain bicycle or a downhill bicycle requiring significant impact strength, an external thread is disposed at one end of a shaft lever and then directly screwed to an internal thread of a frame, thereby improving the impact strength. However, such quick-release structure screwed and locked to the frame by means of threads has the disadvantages that the tension can only be adjusted by a one-side spanner rod, and thus the position of the spanner rod cannot be easily controlled. If the spanner rod is orientated downwards, the quick-release structure may be disengaged due to impact on the spanner rod by foreign matter, but if the spanner rod is forcibly secured upwards, too loose or too tight engagement between the wheel and the frame may be easily caused.

Accordingly, in a prior art, a driving handle can be hidden to achieve the effect of higher safety. However, the quick-release structure disclosed in this patent application has problems such as excessive parts, high manufacturing cost, difficulty in assembly and poor market competitiveness.

Therefore, it is desirable to provide a handle-hidden quick-release structure to mitigate and/or obviate the aforementioned problems.

SUMMARY OF INVENTION

In view of this, in order to solve the problems of a conventional quick-release structure such as poor safety, difficulty in adjustment, excessive parts, high manufacturing cost, difficulty in assembly and poor market competitiveness in the prior art, the invention provides a handle-hidden quick-release structure which comprises: an outer shaft lever having a shaft lever external thread on an outer circumferential surface of one end thereof, at least one clamping slot on the other end face thereof and an axially extending receiving hole, wherein a wall of the receiving hole has a step surface; an internally hidden rotating handle having a first rod body and a second rod body, wherein the first rod body is disposed in the receiving hole of the outer shaft lever, a stop portion radially protrudes outwards from the first rod body, the second rod body has a rod body and a rod head, the rod body is disposed in the receiving hole, one end of the rod body is pivoted to the first rod body, the other end of the rod body is connected with the rod head, and the rod head has an outer diameter greater than the aperture of the receiving hole and located outside the receiving hole; and a spring abutting between the step surface of the outer shaft lever and the stop portion of the internally hidden rotating handle. When the internally hidden rotating handle is not subjected to an external force, the spring provides an elastic prestress for moving the internally hidden rotating handle into the receiving hole; and when the internally hidden rotating handle is pulled by an external force, the second rod body is pivotably clamped into the clamping slot of the outer shaft lever to drive the rotation of the outer shaft lever. Accordingly, the above arrangement can achieve the effects of improved safety, fewer and simple parts, reduced manufacturing cost, reduced difficulty in assembly and market competitiveness.

Other objects, advantages, and novel features of invention will become more apparent from the following detailed description when taken in conjunction with the accompanying drawings.

DETAILED DESCRIPTION OF PREFERRED EMBODIMENT

In order that the examiner can have a still further understanding and recognition of the features and characteristics of the invention, the following preferred embodiments will be listed and described below with reference to the drawings.

Referring to FIGS. 1 to 7, a handle-hidden quick-release structure 100 provided by a preferred embodiment of the invention mainly comprises an outer shaft lever 10, an internally hidden rotating handle 20 and a spring 30.

Figure 1:
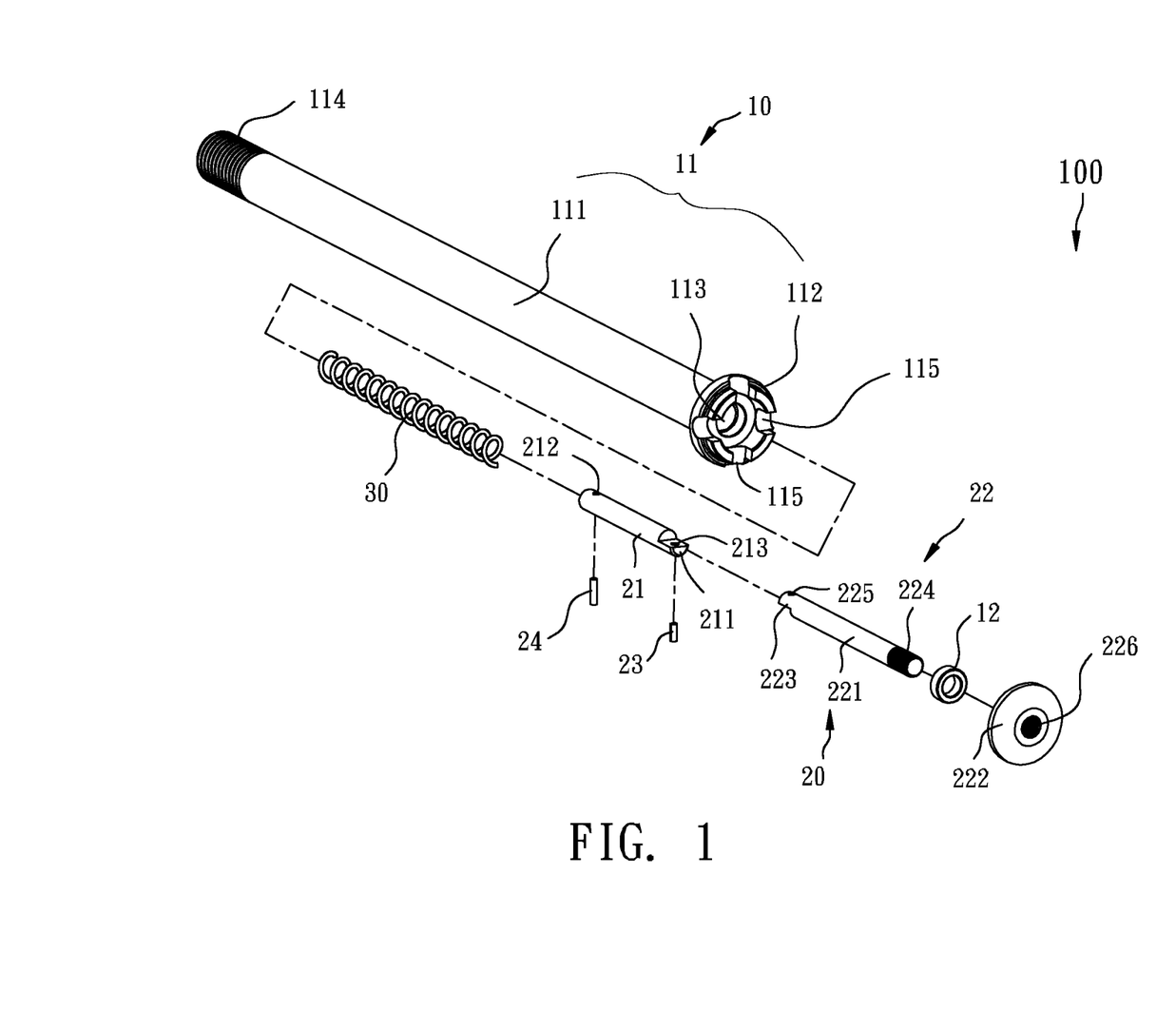
FIG. 1 is an exploded perspective view of a preferred embodiment of the invention.
Figure 2:
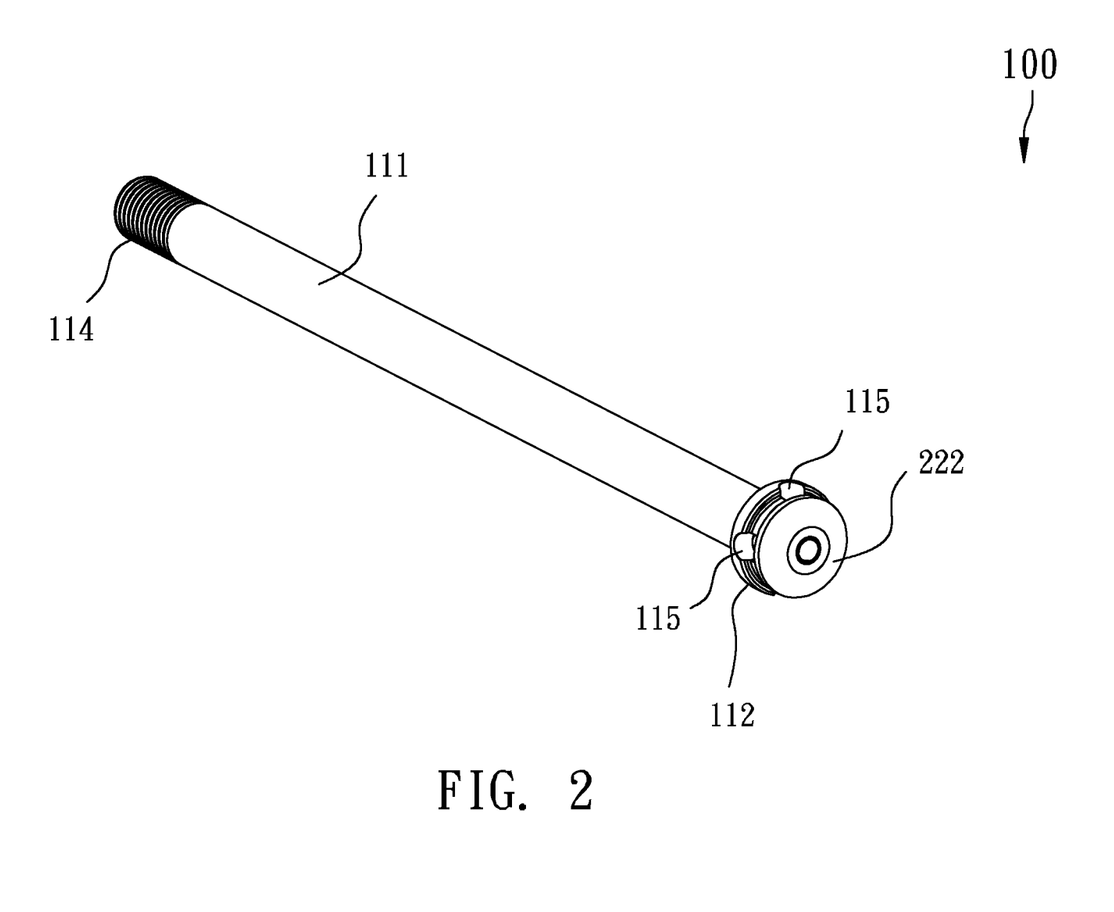
FIG. 2 is an assembled perspective view of the embodiment shown in FIG. 1.
Figure 3:
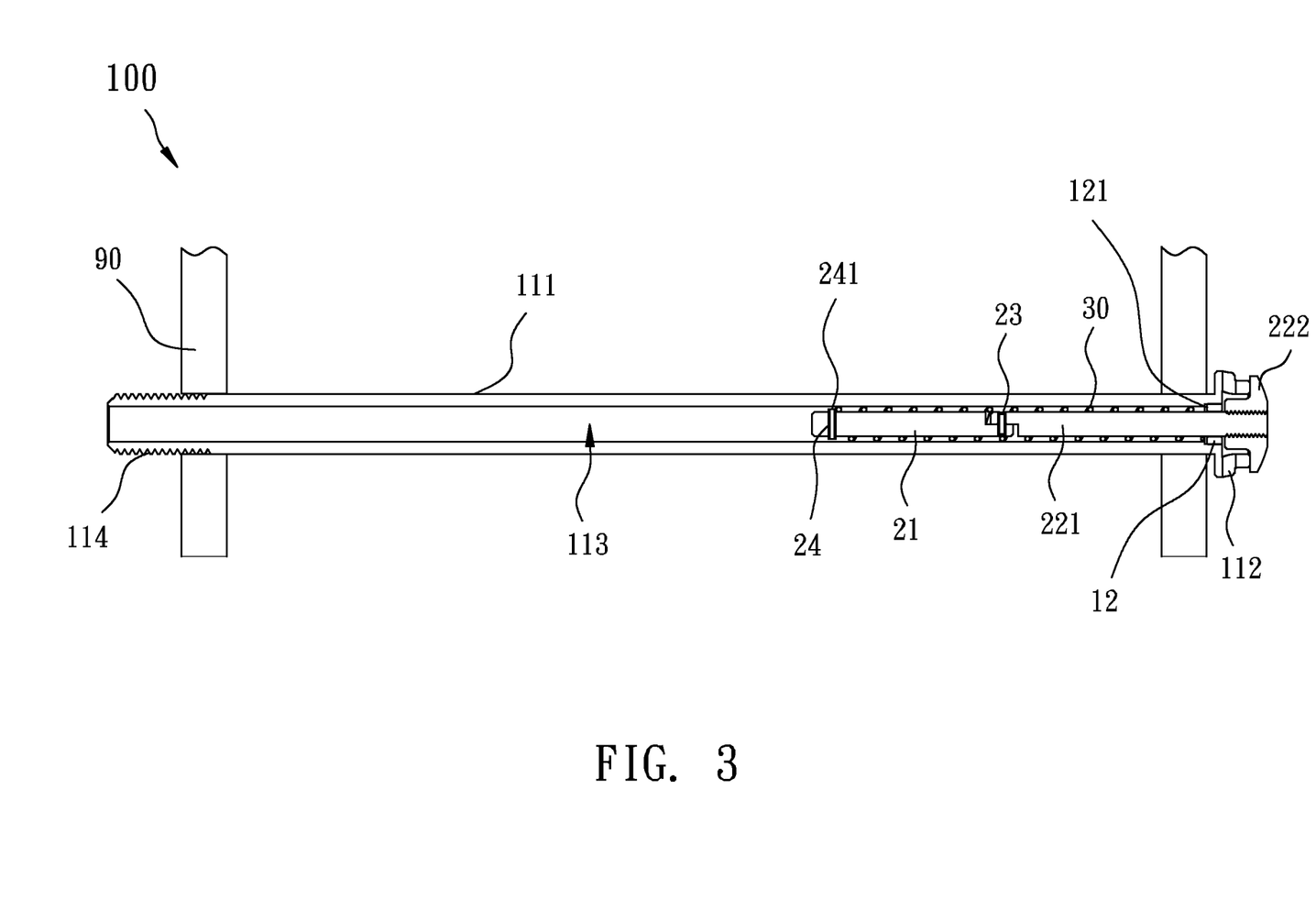
FIGS. 3 to 7 are schematic operation views of the embodiment shown in FIG. 1.

Referring to FIGS. 1 to 3, the outer shaft lever 10 has a shaft lever 11 and a snap ring 12. The shaft lever 11 has a body 111, a head 112 coaxially connected at one end of the body 111 and a receiving hole 113 axially penetrating through the body 111 and the head 112, the outer diameter of the head 112 is greater than that of the body 111, the body 111 has a shaft lever external thread 114 on an outer circumferential surface of a free end thereof, and the head 112 has several clamping slots 115 arrayed in an equiangular and annular recessed manner at a free end face thereof; and the snap ring 12 is tightly fixed on a wall of the receiving hole 113 of the shaft lever 11 and located at a junction between the body 111 and the head 112 such that one end face of the snap ring 12 towards the body 111 is formed as a step surface 121.

Referring to FIGS. 1 to 3, the internally hidden rotating handle 20 has a first rod body 21, a second rod body 22, a pivoting pin 23 and a stop pin 24. The first rod body 21 is disposed in the receiving hole 113 of the outer shaft lever 10, the first rod body 21 has a first pivoting portion 211 at one end thereof and a radially penetrating stop pin insertion hole 212 on an outer circumferential surface of the other end thereof, and a first pivoting hole 213 radially penetrates through the first pivoting portion 211; the second rod body 22 has a rod body 221 and a rod head 222, the rod body 221 is disposed in the receiving hole 113 of the outer shaft lever 10, the rod body 221 has a second pivoting portion 223 at one end thereof and a rod body external thread 224 at the other end thereof, a second pivoting hole 225 radially penetrates through the second pivoting portion 223, the outer diameter of the rod head 222 is greater than that of the rod body 221 and also greater than the aperture of the receiving hole 113, the rod head 222 has a rod head internal thread 226 in its axial direction, and the rod head internal thread 226 is screwed to the external thread 224 of the rod body such that the rod head 222 is coaxially connected at one end of the rod body 221 and located outside the receiving hole 113; the pivoting pin 23 is inserted into the first pivoting hole 213 of the first rod body 21 and the second pivoting hole 225 of the second rod body 22 such that the first rod body 21 is pivoted to the second rod body 22; and the stop pin 24 is inserted into the stop pin insertion hole 212 of the first rod body 21 and both ends of the stop pin 24 project outwards from the stop pin insertion hole 212 such that an outwardly projecting part of the stop pin 24 is formed as a stop portion 241 radially protruding outwards from the first rod body 21.

Referring to FIGS. 1 to 3, the spring 30 is a compression spring, which abuts between the step surface 121 of the outer shaft lever 10 and the stop portion 241 of the internally hidden rotating handle 20, such that the spring 30 provides an elastic prestress for displacing the internally hidden rotating handle 20 into the receiving hole 113.

Accordingly, various components and members of a handle-hidden quick-release structure 100 provided by a preferred embodiment of the invention as well as their assembling ways have been introduced above, and then their use characteristics will be described below.

Figure 4:
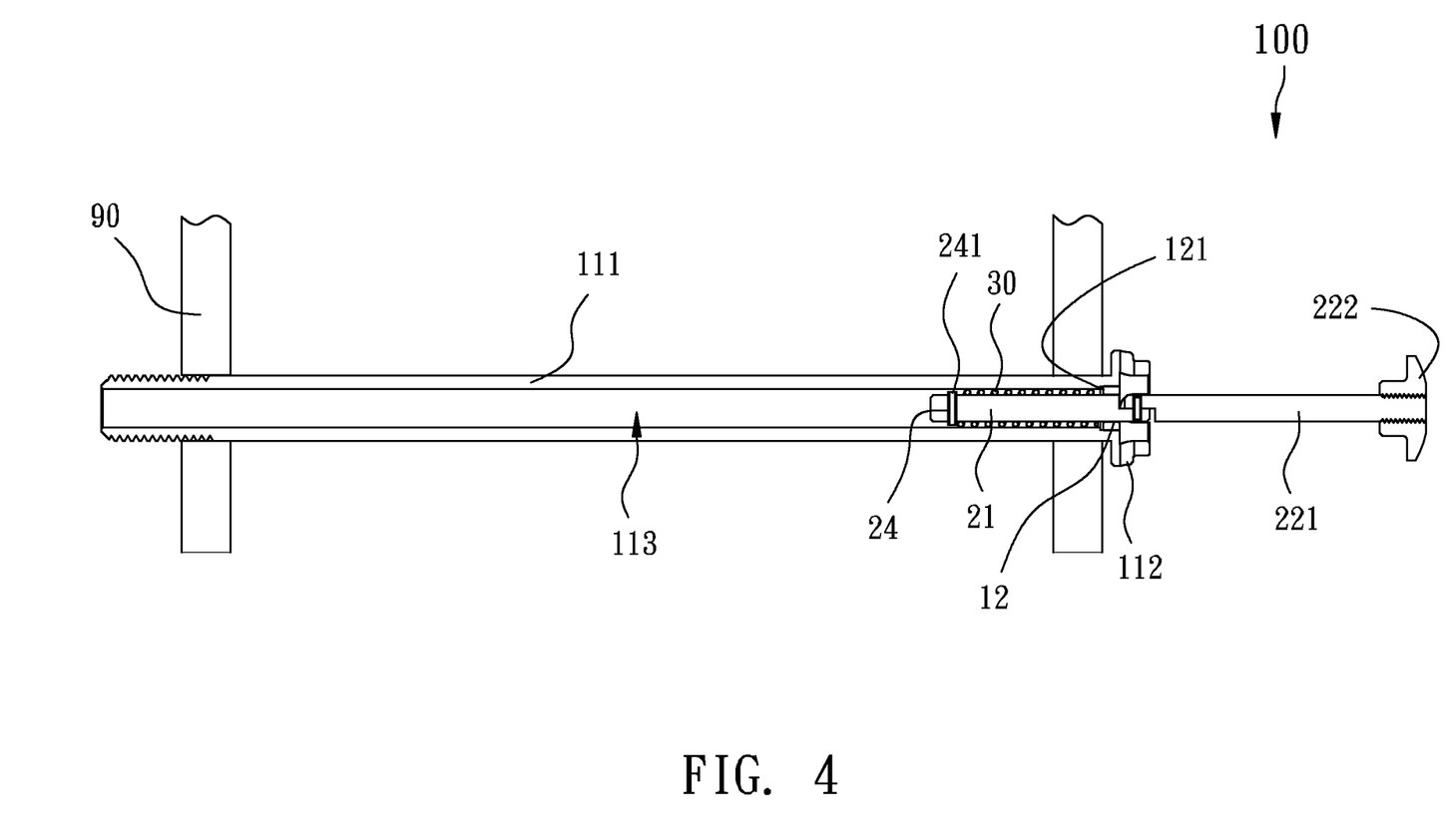
Figure 5:
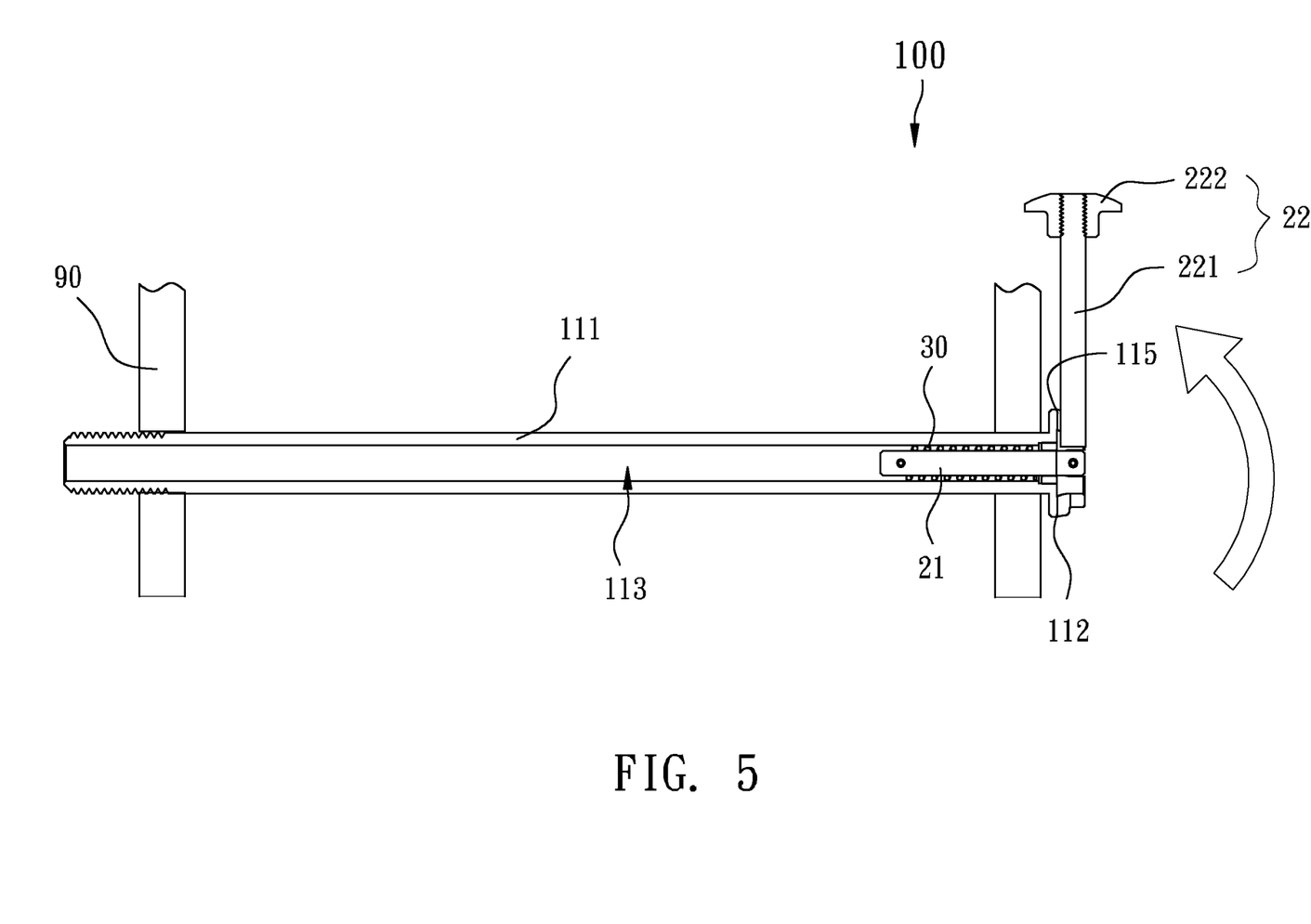
Figure 6:
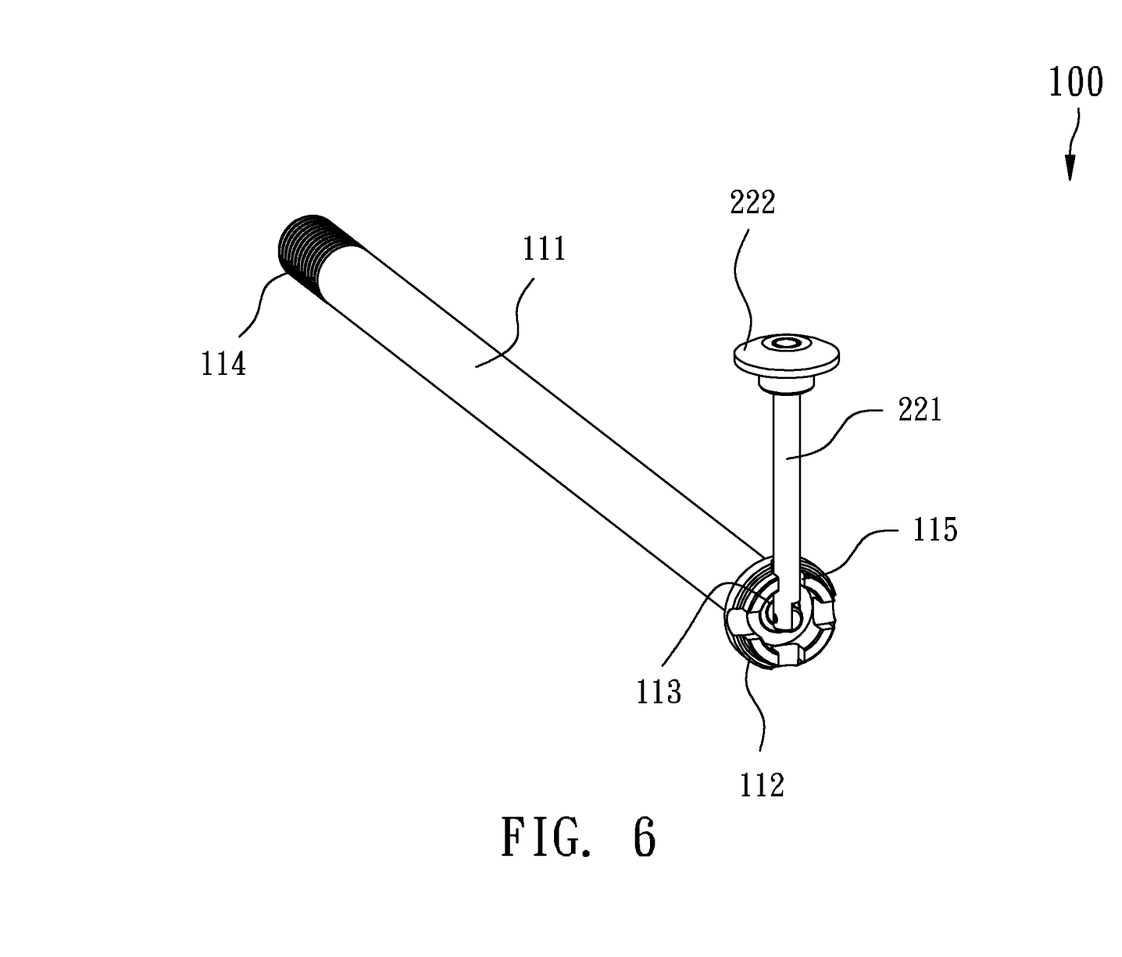
Figure 7:
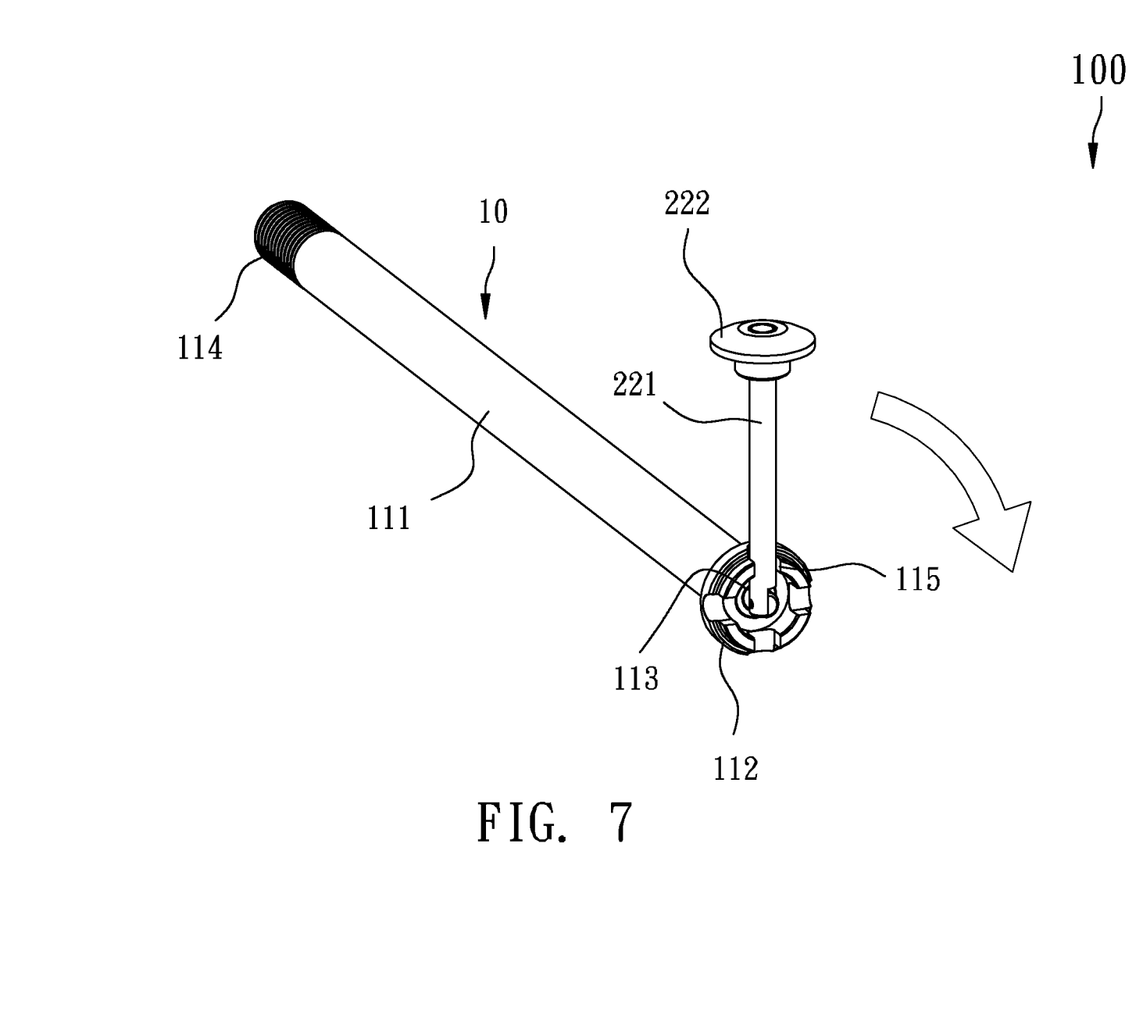

In order to achieve the assembly, detachment or tension adjustment between the handle-hidden quick-release structure 100 of the invention and a frame 90, the second rod body 22 of the internally hidden rotating handle 20 can be pulled out of the receiving hole 113 (as shown in FIG. 4), the spring 30 is then compressed by the stop portion 241 and the step surface 121, the second rod body 22 is then pivoted to be perpendicular to the outer shaft lever 10 (as shown in FIG. 5), the rod body 221 is clamped into any one of clamping slots 115 of the outer shaft lever 10 (as shown in FIG. 6), and then the second rod body 22 is rotated again (as shown in FIG. 7) such that the rotation of the outer shaft lever 10 can be driven at the same time, thereby achieving the assembly, detachment or tension adjustment between the quick-release structure and the frame 90. After the operation is completed, the second rod body 22 can be rotated back to the same axial direction as the receiving hole 113, and then the second rod body 22 is released such that the rod body 221 can be pushed back into the receiving hole 113 (as shown in FIG. 3) under an elastic force of the spring 30.

Accordingly, when the position does not need to be adjusted in the invention, the internally hidden rotating handle 20 for driving the rotation of the outer shaft lever 10 is mostly hidden in the receiving hole 113 of the outer shaft lever 10 and only the disc-shaped rod head 222 is exposed so as to avoid the possibility of being rotated by the impact of foreign objects, thereby providing higher safety, fewer and simple parts, reduced manufacturing cost, reduced difficulty in assembly and market competitiveness in aesthetic appearance.

In addition, the rod body and the rod head can also be integrally connected in the above embodiment.

Figure 8:
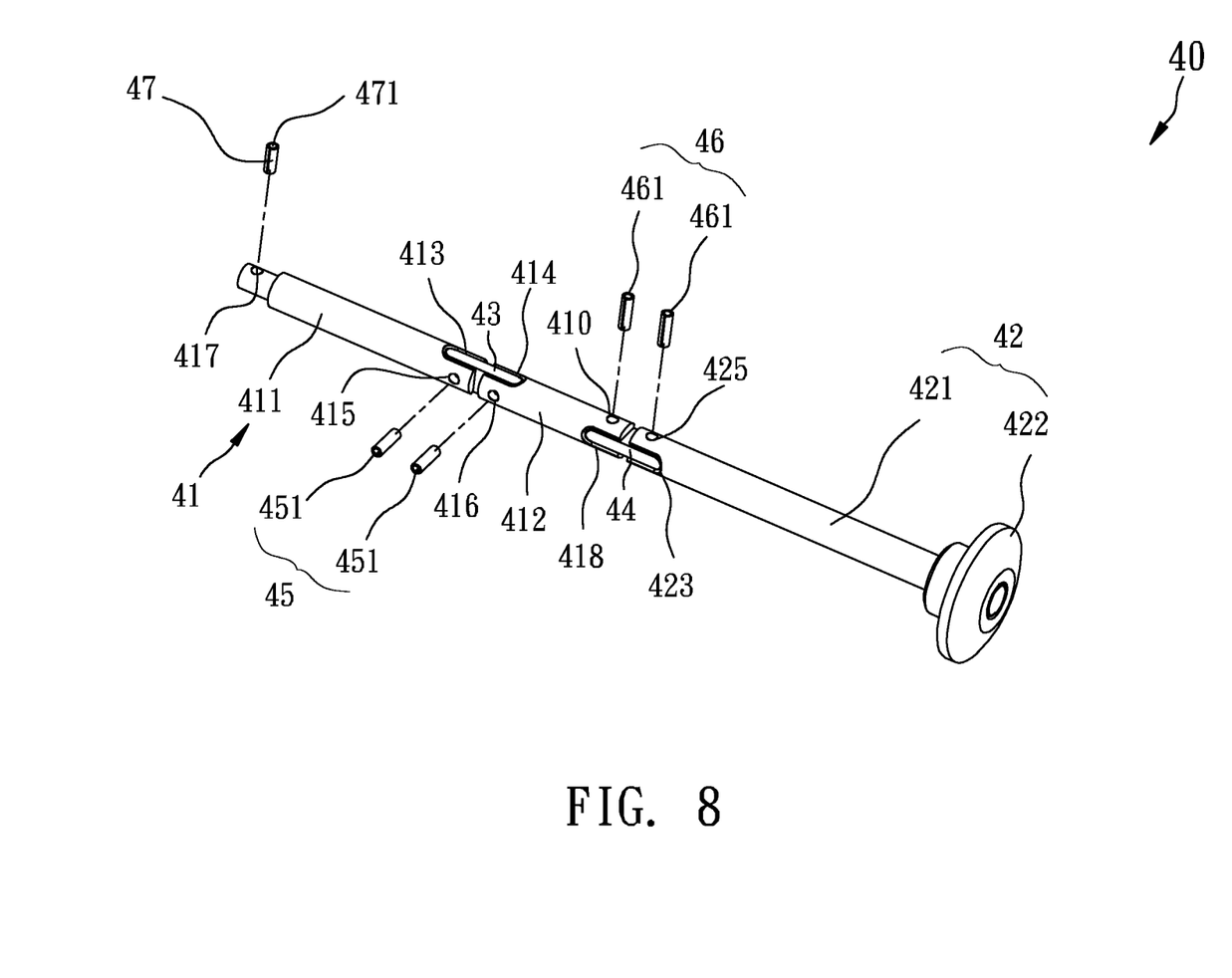
FIG. 8 is another embodiment of an internally hidden rotating handle in the invention.

Next, FIG. 8 shows an internally hidden rotating handle 40 of another embodiment of the invention.

Referring to FIG. 8, the internally hidden rotating handle 40 has a first rod body 41, a second rod body 42, a first pivoting member 43, a second pivoting member 44, a first pivoting pin set 45, a second pivoting pin set 46 and a stop pin 47. The first rod body 41 has a tail shaft 411 and an intermediate shaft 412, one end of the tail shaft 411 has an axially recessed tail shaft pivoting slot 413 and a tail shaft insertion hole 415 radially penetrating through the tail shaft pivoting slot 413, the other end of the tail shaft 411 has a radially penetrating stop pin insertion hole 417, one end of the intermediate shaft 412 has an axially recessed first pivoting slot 414 and a first insertion hole 416 radially penetrating through the first pivoting slot 414, the other end of the intermediate shaft has an axially recessed second pivoting slot 418 and a second insertion hole 410 radially penetrating through the second pivoting slot 418, and the first pivoting slot 414 is perpendicular to the second pivoting slot 418; the second rod body 42 has a rod body 421 and a rod head 422, the outer diameter of the rod head 422 is greater than that of the rod body 421, one end of the rod body 421 is connected with the rod head 422, and the other end of the rod body 421 has an axially recessed rod body pivoting slot 423 and a rod body insertion hole 425 radially penetrating through the rod body pivoting slot 423; the first pivoting member 43 is disposed in the tail shaft pivoting slot 413 and the first pivoting slot 414 of the first rod body 41; the second pivoting member 44 is disposed in the second pivoting slot 418 of the first rod body 41 and the rod body pivoting slot 423 of the second rod body 42; the first pivoting pin set 45 has two pins 451 which are respectively inserted into and penetrate through the first pivoting member 43 from the tail shaft insertion hole 415 of the tail shaft 411 and the first insertion hole 416 of the intermediate shaft 412 such that the tail shaft 411 is pivoted to the intermediate shaft 412 by the first pivoting member 43; the second pivoting pin set 46 has two pins 461 which are respectively inserted into and penetrate through the second pivoting member 44 from the second insertion hole 410 of the intermediate shaft 412 and the rod body insertion hole 425 of the rod body 421 such that the intermediate shaft 412 is pivoted to the rod body 421 of the second rod body 42 by the second pivoting member 44; and the stop pin 47 is inserted into the stop pin insertion hole 417 of the first rod body 41 and both ends of the stop pin 47 project outwards from the stop pin insertion hole 417 such that an outwardly projecting part of the stop pin 47 is formed as a stop portion 471 radially protruding outwards from the first rod body 41.

Accordingly, the second rod body 42 can be reciprocatingly pivoted in one predetermined direction relative to the intermediate shaft 412 of the first rod body 41, and the intermediate shaft 412 of the first rod body 41 can also be reciprocatingly pivoted in another predetermined direction relative to the tail shaft 411; and the pivoting direction of the second rod body 42 relative to the intermediate shaft 412 is different from and perpendicular to that of the intermediate shaft 412 relative to the tail shaft 411 such that more pivoting directions can be used by the invention.

The above disclosures are merely preferred embodiments of the invention and are not intended to limit the implementation scope of the invention. All equivalent changes made by those skilled in the art according to the invention shall fall within the scope covered by the invention.

Although the present invention has been explained in relation to its preferred embodiment, it is to be understood that many other possible modifications and variations can be made without departing from the spirit and scope of invention as hereinafter claimed.

What is claimed is:
1. A hidden-handle quick-release structure, comprising:
an outer shaft lever having a shaft lever external thread on an outer circumferential surface of one end thereof, at least one clamping slot on an opposing end face thereof, and an axially extending receiving hole, a wall of the receiving hole having a step surface;

an internally hidden rotating handle having a first rod body and a second rod body, the first rod body being disposed in the receiving hole of the outer shaft lever, a stop portion radially protruding outwards from the first rod body, the second rod body having a rod head, the second rod body being disposed in the receiving hole, one end of the second rod body being pivoted to the first rod body, another end of the second rod body with comprising the rod head, and the rod head having an outer diameter greater than an aperture of the receiving hole and located outside the receiving hole; and a spring abutting between the step surface of the outer shaft lever and the stop portion of the internally hidden rotating handle;

the spring is configured to bias the internally hidden rotating handle into the receiving hole; and the second rod body being pivotably clamped into the clamping slot of the outer shaft lever to drive rotation of the outer shaft lever;

wherein the outer shaft lever has a shaft body and a head, the head coaxially connected on one end of the shaft body, the receiving hole axially penetrates through the shaft body and the head, an outer diameter of the head being greater than that of the shaft body, the shaft lever external thread located on an outer circumferential surface of another end of the shaft body, and the clamping slot is recessed in the head; and wherein the outer shaft lever also comprises a ring coupled to a wall of the receiving hole and located at a junction between the shaft body and the head, an end face of the ring towards the shaft body defining a stepped surface.

2. The hidden-handle quick-release structure according to claim 1, wherein the first rod body has a first pivoting portion at one end thereof, the second rod body has a second pivoting portion at one end thereof, and the first pivoting portion is pivoted to the second pivoting portion.

3. The hidden-handle quick-release structure according to claim 2, wherein the internally hidden rotating handle also has a pivoting pin; and a first pivoting hole radially penetrates through the first pivoting portion, a second pivoting hole radially penetrates through the second pivoting portion, and the pivoting pin is inserted into the first pivoting hole and the second pivoting hole.

4. The handle hidden hidden-handle quick-release structure according to claim 1, wherein the second rod body has a rod body external thread, the rod head has a rod head internal thread, and the second rod head internal thread is screwed to the rod body external thread.

5. The hidden-handle quick-release structure according to claim 1, wherein more than two said clamping slots are provided, and arrayed in an equiangular and annular recessed manner on the face of the head.

6. The handle-hidden quick-release structure according to claim 1, wherein the internally hidden rotating handle also has a stop pin; and the first rod body has a radially penetrating stop pin insertion hole on an outer circumferential surface thereof, the stop pin is inserted into the stop pin insertion hole, and both ends of the stop pin project outwards from the stop pin insertion hole such that an outwardly projecting part of the stop pin is formed as the stop portion.

7. The hidden-handle quick-release structure according to claim 1, wherein the first rod body of the internally hidden rotating handle has a tail shaft and an intermediate shaft pivoted to the tail shaft, and the stop portion is formed on the tail shaft; and the second rod body is pivoted to the intermediate shaft, such that the intermediate shaft of the first rod body is reciprocatingly pivoted in a predetermined direction relative to the tail shaft, and the second rod body is reciprocatingly pivoted in a predetermined direction relative to the intermediate shaft of the first rod body; and the pivoting direction of the second rod body relative to the intermediate shaft is different from and perpendicular to that of the intermediate shaft relative to the tail shaft.

8. The hidden-handle quick-release structure according to claim 7, wherein the internally hidden rotating handle also has a first pivoting member, a second pivoting member, a first pivoting pin set, a second pivoting pin set, and a stop pin; one end of the tail shaft of the first rod body has an axially recessed tail shaft pivoting slot and a tail shaft insertion hole radially penetrating through the tail shaft pivoting slot, another end of the tail shaft has a radially penetrating stop pin insertion hole, one end of the intermediate shaft has an axially recessed first pivoting slot and a first insertion hole radially penetrating through the first pivoting slot, another end of the intermediate shaft has an axially recessed second pivoting slot and a second insertion hole radially penetrating through the second pivoting slot, and the first pivoting slot is perpendicular to the second pivoting slot; one end of the second rod body has an axially recessed rod body pivoting slot and a rod body insertion hole radially penetrating through the rod body pivoting slot; the first pivoting member is disposed in the tail shaft pivoting slot and the first pivoting slot of the first rod body; the second pivoting member is disposed in the second pivoting slot of the first rod body and the rod body pivoting slot of the second rod body; the first pivoting pin set has two pins which are respectively inserted into and penetrate through the first pivoting member from the tail shaft insertion hole of the tail shaft and the first insertion hole of the intermediate shaft such that the tail shaft is pivoted to the intermediate shaft by the first pivoting member; the second pivoting pin set has two pins which are respectively inserted into and penetrate through the second pivoting member from the second insertion hole of the intermediate shaft and the rod body insertion hole of the rod body such that the intermediate shaft is pivoted to the rod body of the second rod body by the second pivoting member; and the stop pin is inserted into the stop pin insertion hole of the first rod body and both ends of the stop pin project outwards from the stop pin insertion hole such that an outwardly projecting part of the stop pin is formed as the stop portion.

9. A hidden-handle quick-release structure, comprising:
an outer shaft lever having a shaft lever external thread on an outer circumferential surface of one end thereof, at least one clamping slot on an opposing end face thereof, and an axially extending receiving hole, a wall of the receiving hole having a step surface;

an internally hidden rotating handle having a first rod body and a second rod body, the first rod body being disposed in the receiving hole of the outer shaft lever, a stop portion radially protruding outwards from the first rod body, the second rod body having a rod head, the second rod body being disposed in the receiving hole, one end of the second rod body being pivoted to the first rod body, another end of the second rod body comprising the rod head, and the rod head having an outer diameter greater than an aperture of the receiving hole and located outside the receiving hole; and a spring abutting between the step surface of the outer shaft lever and the stop portion of the internally hidden rotating handle;

the spring is configured to bias the internally hidden rotating handle into the receiving hole; and the second rod body being pivotably clamped into the clamping slot of the outer shaft lever to drive rotation of the outer shaft lever;

wherein the internally hidden rotating handle also has a stop pin; and the first rod body has a radially penetrating stop pin insertion hole on an outer circumferential surface thereof, the stop pin is inserted into the stop pin insertion hole, and both ends of the stop pin project outwards from the stop pin insertion hole such that an outwardly projecting part of the stop pin is formed as the stop portion.

10. The hidden-handle quick-release structure according to claim 9, wherein the outer shaft lever has a shaft body and a head coaxially connected at one end of the shaft body, the receiving hole axially penetrates through the shaft body and the head, an outer diameter of the head being greater than that of the shaft body, the shaft lever external thread located on an outer circumferential surface of another end of the shaft body, and the clamping slot is recessed in the head.

11. The hidden-handle quick-release structure according to claim 10, wherein the outer shaft lever also comprises a ring coupled to a wall of the receiving hole and located at a junction between the shaft body and the head, an end face of the ring towards the body defining a stepped surface.

12. The hidden-handle quick-release structure according to claim 10, wherein more than two said clamping slots are provided, and arrayed in an equiangular and annular recessed manner on the face of the head.

13. The hidden-handle quick-release structure according to claim 9, wherein the first rod body has a first pivoting portion at one end thereof, the second rod body has a second pivoting portion at one end thereof, and the first pivoting portion is pivoted to the second pivoting portion.

14. The hidden-handle quick-release structure according to claim 13, wherein the internally hidden rotating handle also has a pivoting pin; a first pivoting hole radially penetrates through the first pivoting portion, a second pivoting hole radially penetrates through the second pivoting portion, and the pivoting pin is inserted into the first pivoting hole and the second pivoting hole.

15. The hidden-handle quick-release structure according to claim 9, wherein the second rod body has a rod body external thread, the rod head has a rod head internal thread, and the rod head internal thread is screwed to the second rod body external thread.

16. The hidden-handle quick-release structure according to claim 9, wherein the first rod body of the internally hidden rotating handle has a tail shaft and an intermediate shaft pivoted to the tail shaft, and the stop portion is formed on the tail shaft; and the second rod body is pivoted to the intermediate shaft, such that the intermediate shaft of the first rod body is reciprocatingly pivoted in a predetermined direction relative to the tail shaft, and the second rod body is reciprocatingly pivoted in a predetermined direction relative to the intermediate shaft of the first rod body; and the pivoting direction of the second rod body relative to the intermediate shaft is different from and perpendicular to that of the intermediate shaft relative to the tail shaft.

17. The hidden-handle quick-release structure according to claim 16, wherein the internally hidden rotating handle also has a first pivoting member, a second pivoting member, a first pivoting pin set, a second pivoting pin set, and a stop pin; one end of the tail shaft of the first rod body has an axially recessed tail shaft pivoting slot and a tail shaft insertion hole radially penetrating through the tail shaft pivoting slot, another end of the tail shaft has a radially penetrating stop pin insertion hole, one end of the intermediate shaft has an axially recessed first pivoting slot and a first insertion hole radially penetrating through the first pivoting slot, another end of the intermediate shaft has an axially recessed second pivoting slot and a second insertion hole radially penetrating through the second pivoting slot, and the first pivoting slot is perpendicular to the second pivoting slot; one end of the second rod body has an axially recessed rod body pivoting slot and a rod body insertion hole radially penetrating through the rod body pivoting slot; the first pivoting member is disposed in the tail shaft pivoting slot and the first pivoting slot of the first rod body; the second pivoting member is disposed in the second pivoting slot of the first rod body and the rod body pivoting slot of the second rod body; the first pivoting pin set has two pins which are respectively inserted into and penetrate through the first pivoting member from the tail shaft insertion hole of the tail shaft and the first insertion hole of the intermediate shaft such that the tail shaft is pivoted to the intermediate shaft by the first pivoting member; the second pivoting pin set has two pins which are respectively inserted into and penetrate through the second pivoting member from the second insertion hole of the intermediate shaft and the rod body insertion hole of the rod body such that the intermediate shaft is pivoted to the rod body of the second rod body by the second pivoting member; and the stop pin is inserted into the stop pin insertion hole of the first rod body and both ends of the stop pin project outwards from the stop pin insertion hole such that an outwardly projecting part of the stop pin is formed as the stop portion.

18. A hidden-handle quick-release structure, comprising:
an outer shaft lever having a shaft lever external thread on an outer circumferential surface of one end thereof, at least one clamping slot on an opposing end face thereof, and an axially extending receiving hole, a wall of the receiving hole having a step surface;

an internally hidden rotating handle having a first rod body and a second rod body, the first rod body being disposed in the receiving hole of the outer shaft lever, a stop portion radially protruding outwards from the first rod body, the second rod body having a rod head, the second rod body being disposed in the receiving hole, one end of the second rod body being pivoted to the first rod body, another end of the second rod body comprising the rod head, and the rod head having an outer diameter greater than an aperture of the receiving hole and located outside the receiving hole; and a spring abutting between the step surface of the outer shaft lever and the stop portion of the internally hidden rotating handle;

the spring is configured to bias the internally hidden rotating handle into the receiving hole; and the second rod body being pivotably clamped into the clamping slot of the outer shaft lever to drive rotation of the outer shaft lever;

wherein the first rod body of the internally hidden rotating handle has a tail shaft and an intermediate shaft pivoted to the tail shaft, and the stop portion is formed on the tail shaft; and the second rod body is pivoted to the intermediate shaft, such that the intermediate shaft of the first rod body is reciprocatingly pivoted in a predetermined direction relative to the tail shaft, and the second rod body is reciprocatingly pivoted in a predetermined direction relative to the intermediate shaft of the first rod body; and the pivoting direction of the second rod body relative to the intermediate shaft is different from and perpendicular to that of the intermediate shaft relative to the tail shaft.

19. The hidden-handle quick-release structure according to claim 18, wherein the internally hidden rotating handle also has a first pivoting member, a second pivoting member, a first pivoting pin set, a second pivoting pin set and a stop pin; one end of the tail shaft of the first rod body has an axially recessed tail shaft pivoting slot and a tail shaft insertion hole radially penetrating through the tail shaft pivoting slot, the other end of the tail shaft has a radially penetrating stop pin insertion hole, one end of the intermediate shaft has an axially recessed first pivoting slot and a first insertion hole radially penetrating through the first pivoting slot, the other end of the intermediate shaft has an axially recessed second pivoting slot and a second insertion hole radially penetrating through the second pivoting slot, and the first pivoting slot is perpendicular to the second pivoting slot; one end of the rod body of the second rod body has an axially recessed rod body pivoting slot and a rod body insertion hole radially penetrating through the rod body pivoting slot; the first pivoting member is disposed in the tail shaft pivoting slot and the first pivoting slot of the first rod body; the second pivoting member is disposed in the second pivoting slot of the first rod body and the rod body pivoting slot of the second rod body; the first pivoting pin set has two pins which are respectively inserted into and penetrate through the first pivoting member from the tail shaft insertion hole of the tail shaft and the first insertion hole of the intermediate shaft such that the tail shaft is pivoted to the intermediate shaft by the first pivoting member; the second pivoting pin set has two pins which are respectively inserted into and penetrate through the second pivoting member from the second insertion hole of the intermediate shaft and the rod body insertion hole of the rod body such that the intermediate shaft is pivoted to the rod body of the second rod body by the second pivoting member; and the stop pin is inserted into the stop pin insertion hole of the first rod body and both ends of the stop pin project outwards from the stop pin insertion hole such that an outwardly projecting part of the stop pin is formed as the stop portion.

20. The hidden-handle quick-release structure according to claim 18, wherein the second rod body has a rod body external thread, the rod head has a rod head internal thread, and the rod head internal thread is screwed to the second rod body external thread.

* * * * *